(12) United States Patent
Kawamura et al.

(10) Patent No.: US 8,868,702 B2
(45) Date of Patent: Oct. 21, 2014

(54) SERVER DEVICE AND PROGRAM PRODUCT

(75) Inventors: Takuya Kawamura, Kanagawa (JP); Hiroshi Kawazoe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 13/232,262

(22) Filed: Sep. 14, 2011

(65) Prior Publication Data

US 2012/0131092 A1   May 24, 2012

(30) Foreign Application Priority Data

Nov. 19, 2010   (JP) .................................. 2010-259154

(51) Int. Cl.
G06F 15/177 (2006.01)
H04L 29/06 (2006.01)
H04L 29/08 (2006.01)

(52) U.S. Cl.
CPC ................ H04L 67/08 (2013.01); H04L 69/04 (2013.01)
USPC .......................................... 709/221; 709/228

(58) Field of Classification Search
None
See application file for complete search history.

(56) References Cited

U.S. PATENT DOCUMENTS

| | | | | |
|---|---|---|---|---|
| 8,171,169 | B2 * | 5/2012 | Bullard et al. ................. | 709/247 |
| 8,319,728 | B2 * | 11/2012 | Geffin et al. ................... | 345/157 |
| 2009/0210817 | A1 * | 8/2009 | Schmieder et al. ............ | 715/781 |
| 2011/0141123 | A1 * | 6/2011 | Kumar et al. ................. | 345/520 |

FOREIGN PATENT DOCUMENTS

| | | |
|---|---|---|
| JP | 07160428 | 6/1995 |
| JP | 2005-501355 | 1/2005 |
| JP | 2007241736 | 9/2007 |
| JP | 2008-040347 | 2/2008 |
| JP | 2010-118976 | 5/2010 |
| WO | 03019927 | 3/2003 |

OTHER PUBLICATIONS

Japanese Office Action for Japanese Application No. 2010-259154 mailed on Nov. 13, 2012.

* cited by examiner

*Primary Examiner* — Ario Etienne
*Assistant Examiner* — Clayton R Williams
(74) *Attorney, Agent, or Firm* — Amin, Turocy & Watson, LLP

(57) ABSTRACT

According to one embodiment, a server device connected to a client device by way of a network includes a receiving unit, a first detecting unit, a cycle changing unit, a second detecting unit, and a transmitting unit. The receiving unit receives operation data through the network. The first detecting unit detects, from among operation events based on the received operation data, a specific operation event. The cycle changing unit, when the specific operation event is detected, changes a change detection cycle for screen data that is updated in an application in accordance with the specific operation event from a first cycle to a second cycle that is longer than the first cycle. The second detecting unit detects a change in the screen data in the second cycle. The transmitting unit transmits the screen data, in which the change is detected, to the client device.

10 Claims, 16 Drawing Sheets

SERVER DEVICE AND PROGRAM PRODUCT

CROSS-REFERENCE TO RELATED APPLICATION(S)

This application is based upon and claims the benefit of priority from Japanese Patent Application No. 2010-259154, filed on Nov. 19, 2010; the entire contents of which are incorporated herein by reference.

FIELD

Embodiments described herein relate generally to a server device and a program product.

BACKGROUND

Conventionally, a screen transmitting system for distributing the screen data of a first terminal to a second terminal connected thereto by way of a network in real time has been known. In such a screen transmitting system, the second terminal sends operation data of an operation performed on the second terminal to the first terminal, and the first terminal creates a screen in accordance with the received operation data and sends screen data of the created screen to the second terminal.

DETAILED DESCRIPTION

In general, according to one embodiment, a server device connected to a client device by way of a network includes a receiving unit, a first detecting unit, a cycle changing unit, a second detecting unit, and a transmitting unit. The receiving unit receives operation data through the network. The first detecting unit detects, from among operation events based on the received operation data, a specific operation event. The cycle changing unit, when the specific operation event is detected, changes a change detection cycle for screen data that is updated in an application in accordance with the specific operation event from a first cycle to a second cycle that is longer than the first cycle. The second detecting unit detects a change in the screen data in the second cycle. The transmitting unit transmits the screen data, in which the change is detected, to the client device.

First Embodiment

Figure 1:
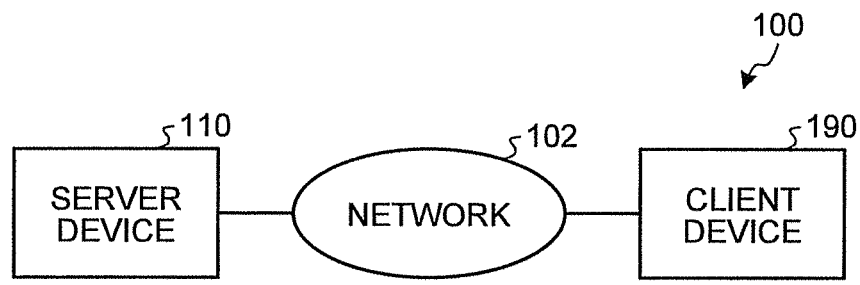
FIG. 1 is a block diagram showing an example structure of a screen transmitting system according to a first embodiment.

FIG. 1 is a block diagram showing an example structure of a screen transmitting system 100 according to a first embodiment. As illustrated in FIG. 1, the screen transmitting system 100 includes a server device 110 that transmits screen data and a client device 190 that receives the screen data. The server device 110 and the client device 190 are connected to each other by way of a network 102. The network 102 may be realized by a local area network (LAN) or the Internet, and it may establish a wired or wireless connection.

The server device 110 may be any device as long as it has a function of transmitting the screen data to the client device 190. On the server device 110, an application software program for generating screen data and a software program for a server of the screen transmitting system are activated. The server software program is used for screen data transmission, and also has a function of notifying the application software program of the operation data that is transmitted from the client device 190.

The server device 110 creates screen data, and transmits the created screen data to the client device 190 through the network 102. In addition, when receiving the operation data from the client device 190, the server device 110 creates screen data in accordance with the received operation data, and transmits the created screen data to the client device 190 through the network 102.

The client device 190 can be any device as long as it has a function of receiving the screen data from the server device 110. On the client device 190, a software program for a client of the screen transmitting system is activated. The client software program is used for screen data reception, and also has a function of transmitting operation data that indicates any operation performed on the client device 190 to the server device 110.

The client device 190 receives the screen data from the server device 110, and displays a screen based on the received screen data on a displaying unit (not shown) such as a display. In addition, when the user performs an operation onto the screen displayed on the displaying unit, the client device 190 transmits the operation data that indicates what operation has been performed to the server device 110.

In the screen transmitting system 100, the server device 110 uses a push-type screen transmission protocol to transmit the screen data to the client device 190. With the push type, the screen data is transmitted from the screen data transmission side to the screen data reception side, without requiring any screen data acquisition request from the screen data reception side. In other words, according to the present embodiment, the screen data is transmitted from the server device 110 on which the server software program is activated to the client device 190 on which the client software program is activated, without requiring a screen data acquisition request sent from the client device 190.

The screen transmitting method, however, is not limited to the push type, and may be a pull type. With the pull type, the screen data is transmitted from the screen data transmission side (server device 110) to the screen data reception side (client device 190) in response to a screen data acquisition request sent from the screen data reception side.

As discussed above, in the screen transmitting system 100, a screen created by the server device 110 is transmitted to the client device 190, and displayed on the client device 190.

Figure 2:
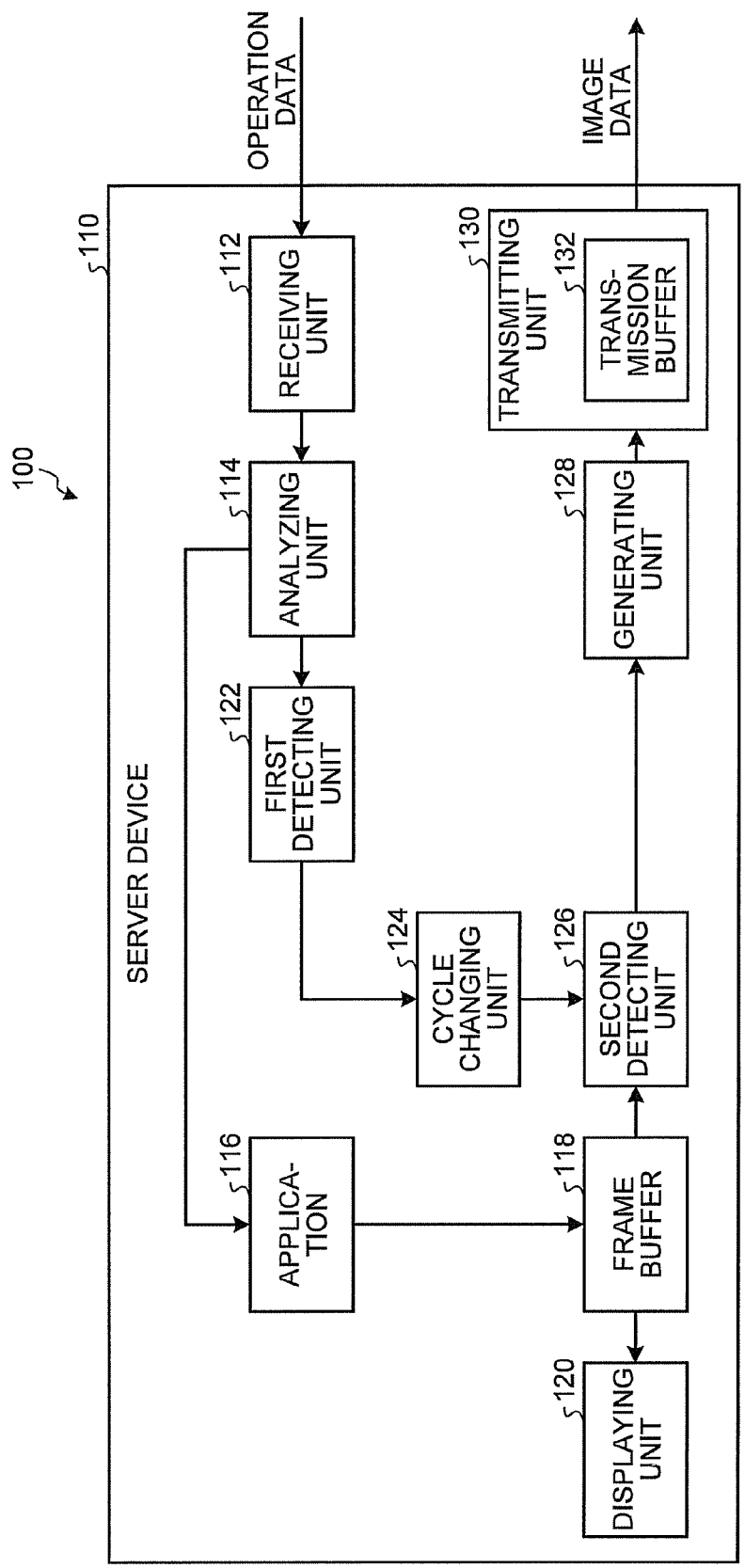
FIG. 2 is a block diagram showing an example structure of a server device according to the first embodiment.

FIG. 2 is a block diagram showing an example structure of the server device 110 according to the first embodiment. As illustrated in FIG. 2, the server device 110 includes a receiving unit 112, an analyzing unit 114, an application 116, a frame buffer 118, a displaying unit 120, a first detecting unit 122, a cycle changing unit 124, a second detecting unit 126, a generating unit 128, and a transmitting unit 130.

The receiving unit 112 receives data that includes operation data (operation signals) and the like through the network 102. More specifically, the receiving unit 112 receives data from the client device 190 by use of network protocols such as Transmission Control Protocol (TCP)/Internet Protocol (IP). For example, the receiving unit 112 sequentially receives packets by use of a connection established with the client software program activated on the client device 190, and constructs the data transmitted by the client device 190 from the received packets.

The analyzing unit 114 analyzes the data received by the receiving unit 112, and generates an operation event that corresponds to the operation data included in the received data. The operation data may be mouse operation data that represents a mouse operation such as mouse moving, clicking, and double clicking, or key operation data that represents a pressed key of the keyboard.

The application 116 may be any application for generating screen data, such as a video reproducing application, a presentation application, a drawing tool application, and a three-dimensional computer aided design (CAD) application. In the present embodiment, the application 116 will be explained by using a video reproducing application as an example, but it is not limited thereto. Furthermore, the application 116 does not have to be a single application, but may be multiple applications. The application 116 creates screen data (image data) for each frame in accordance with the video data of a reproduction target or the operation event generated by the analyzing unit 114, and renders it in the frame buffer 118.

The frame buffer 118 is a memory in which the screen data is rendered by the application 116. The frame buffer 118 in the present embodiment stores therein the previous screen data, the current screen data, and updated screen data that is a portion of the current screen data updated from the previous screen data, but it is not limited thereto.

The displaying unit 120 displays a screen on the basis of the screen data rendered in the frame buffer 118 (more specifically, the current screen data), and it can be realized, for example, by a liquid crystal display.

The first detecting unit 122 detects a specific operation event from among operation events (operation events generated by the analyzing unit 114) based on the operation data that is received by the receiving unit 112. In the present embodiment, it is assumed that the specific operation event is a mouse moving event that indicates a move of the mouse, but it is not limited thereto. The mouse moving event does not always have to indicate the move of the mouse, but may also indicate the position of the mouse pointer.

More specifically, the first detecting unit 122 detects that the occurrence frequency of the mouse moving event per unit time becomes greater than or equal to the first occurrence frequency. In general, the mouse is often moved before a specific operation (e.g., mouse clicking) accompanied by a screen change such as the shut-off of the screen (termination of the reproduction) and presentation of a pop-up screen is conducted. This is because such an operation accompanied by a screen change is usually performed on a specific denotation (e.g., icon) displayed on the screen. In other words, before a specific operation event occurs in response to a specific operation accompanied by a screen change, it is highly likely that a mouse moving event takes place. For this reason, the first detecting unit 122 predicts, when detecting that the occurrence frequency of the mouse moving event per unit time becomes greater than or equal to the first occurrence frequency, that a specific operation event accompanied by a screen change such as mouse clicking or double-clicking, or a key pressing will occur in the near future. The first occurrence frequency may be 20 mouse moving events or more occurred per second or 20 per-second mouse moving events occurred for three seconds, but it is not limited thereto and it can be suitably determined.

When detecting that the occurrence frequency of the mouse moving event per unit time becomes greater than or equal to the first occurrence frequency, the first detecting unit 122 shifts the status from a normal status to a specific operation predicted status in which a specific operation event is predicted, and outputs a specific operation prediction start signal to the cycle changing unit 124. The first detecting unit 122 may be configured to shift the status to the specific operation predicted status and output the specific operation prediction start signal to the cycle changing unit 124 a certain period of time after detecting that the occurrence frequency of the mouse moving event per unit time becomes greater than or equal to the first occurrence frequency.

The first detecting unit 122 may be configured to predict the occurrence of a specific operation event accompanied by a screen change, by use of not only the occurrence frequency of the mouse moving event but also the positional data of the mouse pointer. By doing so, the occurrence prediction accuracy of a specific operation event can be improved. An example of prediction of a screen change-accompanied specific operation event performed by also using the positional data of the mouse is explained below with reference to FIG. 3.

Figure 3:
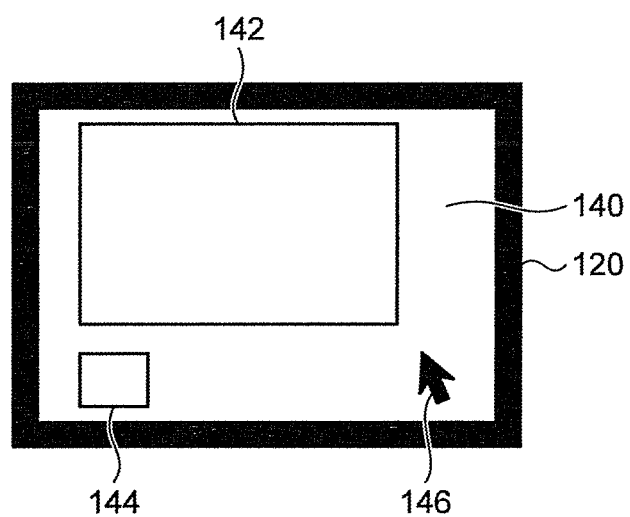
FIG. 3 is a diagram showing an example screen according to the first embodiment.

FIG. 3 is a diagram showing an example of a screen 140 presented on the displaying unit 120 in the first embodiment. In the example of FIG. 3, a video screen 142, an operation screen 144 that shows a button switch for video reproducing and pausing, and a mouse pointer 146 are displayed on the screen 140 presented on the displaying unit 120.

In the example of FIG. 3, the first detecting unit 122 compares the positional data of the operation screen 144 with the positional data of the mouse pointer 146 included in the mouse moving event, and determines whether the mouse pointer 146 is positioned in the vicinity of the operation screen 144. Here, the first detecting unit 122 may store therein the positional data of the operation screen 144 in advance, or may use the detection result obtained by the second detecting unit 126, which is discussed later, from the frequency of the screen change. Then, the first detecting unit 122 predicts, when detecting that the occurrence frequency of the mouse moving event per unit time becomes greater than or equal to the first occurrence frequency with the mouse pointer 146 positioned in the vicinity of the operation screen 144, that a specific operation event accompanied by a screen change will occur. For example, the first detecting unit 122 predicts that a specific operation event accompanied by a screen change will occur, when 20 mouse moving events or more per second within 500 pixels from the operation screen 144 are detected.

In the example of FIG. 3, the first detecting unit 122 may be configured to compare the positional data of the operation screen 144 with the positional data of the mouse pointer 146 included in the mouse moving event and determine whether the mouse pointer 146 is approaching the operation screen 144. Then, the first detecting unit 122 may be configured to predict a specific operation event accompanied by a screen change when detecting, with the mouse pointer 146 approaching the operation screen 144, that the occurrence frequency of the mouse moving event per unit time becomes greater than or equal to the first occurrence frequency. For example, the first detecting unit 122 may be configured to predict a specific operation event accompanied by a screen change when detecting 20 mouse moving events or more per second in a situation that the distance between the mouse pointer 146 and the operation screen 144 decreases.

Referring back to FIG. 2, after detecting that the occurrence frequency of the mouse moving event per unit time becomes greater than or equal to the first occurrence frequency, the first detecting unit 122 further detects that the occurrence frequency becomes smaller than or equal to the second occurrence frequency. This is to cancel the specific operation predicted status. The second occurrence frequency may be one mouse moving event or less per second for 5 seconds or more, but it is not limited thereto and it can be suitably determined.

When detecting in the specific operation predicted status that the occurrence frequency of the mouse moving event per unit time becomes smaller than or equal to the second occurrence frequency, the first detecting unit 122 cancels the specific operation predicted status to shift to the normal status, and outputs a specific operation prediction cancellation signal to the cycle changing unit 124. The first detecting unit 122 may be configured to cancel the specific operation predicted status and output the specific operation prediction cancellation signal to the cycle changing unit 124 a certain period of time after detecting that the occurrence frequency of the mouse moving event per unit time becomes smaller than or equal to the second occurrence frequency.

When the first detecting unit 122 detects a specific operation event, the cycle changing unit 124 changes the cycle of change detection in the screen data, which is image data updated in the application 116, from the first cycle to the second cycle longer than the first cycle. More specifically, when the first detecting unit 122 detects that the occurrence frequency of the mouse moving event per unit time becomes greater than or equal to the first occurrence frequency, i.e., when a specific operation prediction start signal is input from the first detecting unit 122, the cycle changing unit 124 changes the cycle of change detection in the screen data from the first cycle to the second cycle. Similarly, when the specific operation prediction cancellation signal is input from the first detecting unit 122, the cycle changing unit 124 changes the cycle of change detection in the screen data from the second cycle to the first cycle.

For example, the cycle changing unit 124 changes the screen data change detection cycle from 40 milliseconds to 140 milliseconds when the specific operation prediction start signal is input, and changes the screen data change detection cycle from 140 milliseconds to 40 milliseconds when the specific operation prediction cancellation signal is input. The values of the first and second cycles are not limited to the above and may be suitably determined.

If the later-described second detecting unit 126 is allowed to detect changes in the screen data in different cycles for different areas of the screen in the example of FIG. 3, the cycle changing unit 124 may be configured to change the change detection cycle only for the video screen 142 (an area of the video screen 142 indicated by the positional data) from the first cycle to the second cycle. In such a case, the cycle changing unit 124 may store therein the positional data of the video screen 142 in advance, or may use the detection result obtained by the later-described second detecting unit 126 from the frequency of screen changes or the like.

The second detecting unit 126 determines whether the screen data (image data) changes in the cycle changed by the cycle changing unit 124. In other words, if the change detection cycle is 40 milliseconds, the second detecting unit 126 determines whether the screen data changes every 40 milliseconds, and if the change detection cycle is 140 milliseconds, it determines whether the screen data changes every 140 milliseconds.

For example, the second detecting unit 126 compares the previous screen data stored in the frame buffer 118 with the current screen data for each pixel in the cycle updated by the cycle changing unit 124. Thereafter, when any change is detected in the screen data, the second detecting unit 126 stores in the frame buffer 118 the updated screen data, which is screen data of a portion of the current screen data that is updated (changed) from the previous screen data, and notifies the generating unit 128 of the generation of the updated screen data.

When the generation of the updated screen data is notified by the second detecting unit 126, the generating unit 128 obtains the updated screen data stored in the frame buffer 118, and generates compressed screen data by compressing the updated screen data that is obtained. Then, the generating unit 128 outputs the generated compressed screen data to the transmitting unit 130.

The transmitting unit 130 transmits the screen data (image data) in which any change is detected by the second detecting unit 126, to the client device 190. More specifically, the transmitting unit 130 includes a transmission buffer 132, stores the compressed screen data output from the generating unit 128 into the transmission buffer 132, and sequentially transmits the compressed screen data that has been stored in the transmission buffer 132 to the client device 190 by use of network protocols such as TCP/IP. For example, the transmitting unit 130 packetizes the compressed screen data, and transmits the packets by way of a connection established between itself and the client software program activated on the client device 190.

Figure 4:
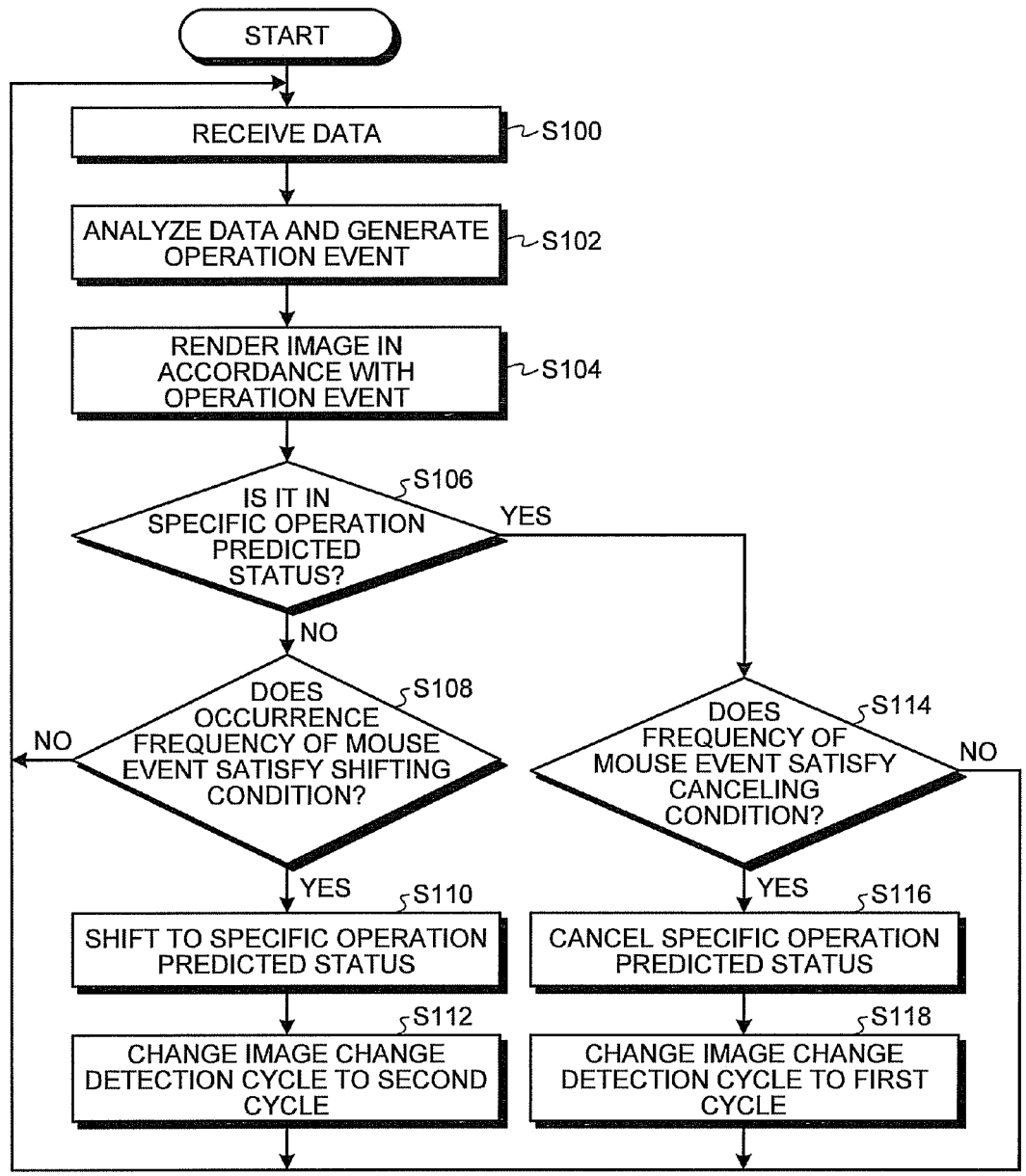
FIG. 4 is a flowchart of an example of a change detection cycle changing process according to the first embodiment.

FIG. 4 is a flowchart of an example of the screen change detection cycle changing process performed by the server device 110 according to the first embodiment.

First, the receiving unit 112 receives data from the client device 190 (step S100).

Thereafter, the analyzing unit 114 analyzes the data received by the receiving unit 112, and generates an operation event corresponding to the operation data included in the received data (step S102).

Then, the application 116 creates screen data (image data) in accordance with both video data of the reproduction target and the operation event generated by the analyzing unit 114, and renders it in the frame buffer 118 (step S104).

Then, the first detecting unit 122 determines whether the current status is the specific operation predicted status in which the occurrence of a specific operation event is predicted (step S106).

When it is not the specific operation predicted status (no at step S106), the first detecting unit 122 determines whether the occurrence frequency of the mouse event satisfies the condition of shifting to the specific operation predicted status, or in other words, whether the occurrence frequency of the mouse moving event per unit time becomes greater than or equal to the first occurrence frequency (step S108).

When the first detecting unit 122 detects that the occurrence frequency of the mouse moving event per unit time becomes smaller than the first occurrence frequency (no at step S108), the system returns to step S100.

On the other hand, when the first detecting unit 122 detects that the occurrence frequency of the mouse moving event per unit time becomes greater than or equal to the first occurrence frequency (yes at step S108), it shifts the status to the specific operation predicted status (step S110), and outputs the specific operation prediction start signal to the cycle changing unit 124.

Thereafter, when the specific operation prediction start signal output from the first detecting unit 122 is input, the cycle changing unit 124 changes the change detection cycle for the screen data (image data) from the first cycle to the second cycle (step S112), and the system returns to step S100.

On the other hand, when the current status is the specific operation predicted status (yes at step S106), the first detecting unit 122 determines whether the occurrence frequency of the mouse event satisfies the condition of canceling the specific operation predicted status, or in other words, the occurrence frequency of the mouse moving event per unit time becomes smaller than or equal to the second occurrence frequency (step S114).

When the first detecting unit 122 detects that the occurrence frequency of the mouse moving event per unit time exceeds the second occurrence frequency (no at step S114), the system returns to step S100.

On the other hand, when detecting that the occurrence frequency of the mouse moving event per unit time becomes smaller than or equal to the second occurrence frequency (yes at step S114), the first detecting unit 122 cancels the specific operation predicted status (step S116), and outputs the specific operation prediction cancellation signal to the cycle changing unit 124.

Thereafter, when the specific operation prediction cancellation signal output from the first detecting unit 122 is input, the cycle changing unit 124 changes the change detection cycle for the screen data (image data) from the second cycle to the first cycle (step S118), and the system returns to step S100.

Figure 5:
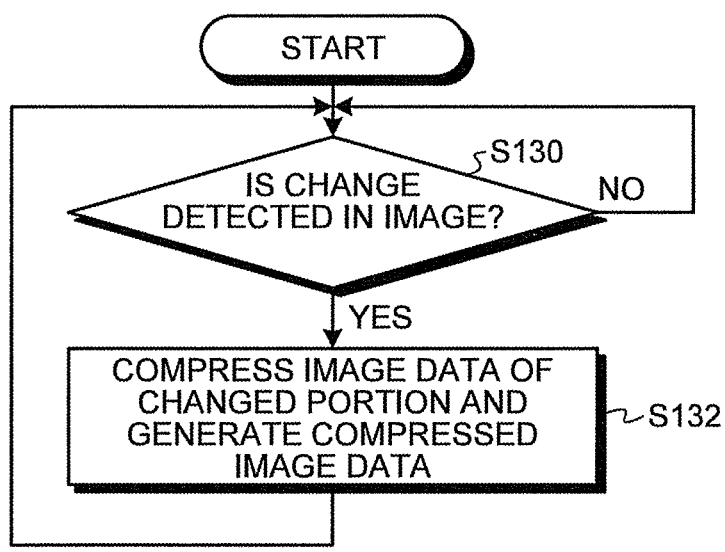
FIG. 5 is a flowchart of an example of a screen change detecting process according to the first embodiment.

FIG. 5 is a flowchart of an example of the screen change detecting process performed by the server device 110 according to the first embodiment.

First, the second detecting unit 126 determines that the screen data (image data) changes in the cycle updated by the cycle changing unit 124 (step S130). In other words, if the change detection cycle is the first cycle, the second detecting unit 126 detects whether the screen data changes every first cycle, and if the change detection cycle is the second cycle, it determines whether the screen data changes every second cycle.

When the second detecting unit 126 detects any change in the screen data (yes at step S130), the generating unit 128 generates the compressed screen data (compressed image data) by compressing the updated screen data (updated image data) of the updated (changed) portion (step S132) and outputs it to the transmitting unit 130, and the system returns to step S130.

On the other hand, when the second detecting unit 126 does not detect any change in the screen data (no at step S130), the system returns to step S130.

Figure 6:
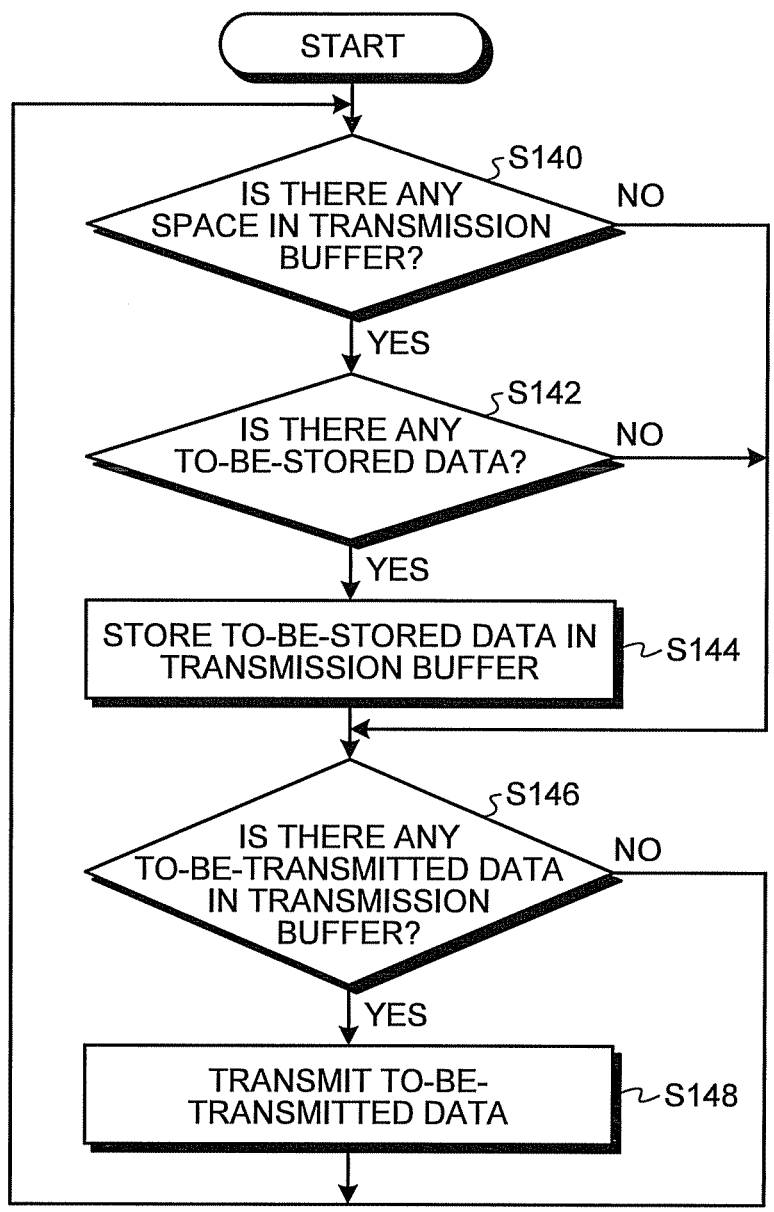
FIG. 6 is a flowchart of an example of a transmitting process according to the first embodiment.

FIG. 6 is a flowchart of an example of the transmitting process performed by the server device 110 according to the first embodiment.

First, the transmitting unit 130 checks whether there is any space in the transmission buffer 132 (step S140).

When there is some space in the transmission buffer 132 (yes at step S140), the transmitting unit 130 checks whether there is any to-be-stored data such as the compressed screen data created by the generating unit 128 (step S142).

When there is any to-be-stored data (yes at step S142), the transmitting unit 130 stores the to-be-stored data in the transmission buffer 132 (step S144).

If there is no space in the transmission buffer 132 (no at step S140), or if there is no to-be-stored data (no at step S142), the system proceeds to step S146.

Thereafter, the transmitting unit 130 checks whether there is any to-be-transmitted data in the transmission buffer 132 (step S146).

When there is any to-be-transmitted data (yes at step S146), the transmitting unit 130 transmits the to-be-transmitted data to the client device 190 (step S148), and the system returns to step S140.

When there is no to-be-transmitted data (no at step S146), the system returns to step S140.

As discussed above, according to the first embodiment, when the occurrence frequency of the mouse moving event per unit time becomes greater than or equal to the first occurrence frequency, the change detection cycle of the screen data is changed from the first cycle to the second cycle that is longer than the first cycle. For this reason, even when screen transmission is constantly being performed from the server device 110 to the client device 190, the amount of to-be-transmitted data generated by the generating unit 128 can be suppressed, and thus the amount of data stored in the transmission buffer 132 can be suppressed. Thus, the possibility of avoiding the situation of no available space in the transmission buffer 132 is increased, and even when a specific operation event accompanied by a screen change such as mouse clicking or double-clicking and key pressing occurs in the near future, the screen data generated in accordance with this specific operation event can be transmitted to the client device 190 without delay. In other words, even when screen transmission is being constantly conducted from the server device 110 to the client device 190, the response time at which a screen change accompanied by a specific operation is reflected on the client device 190 after the specific operation performed on the client device 190 can be prevented from being delayed, and excellent operability can be maintained.

Figure 7:
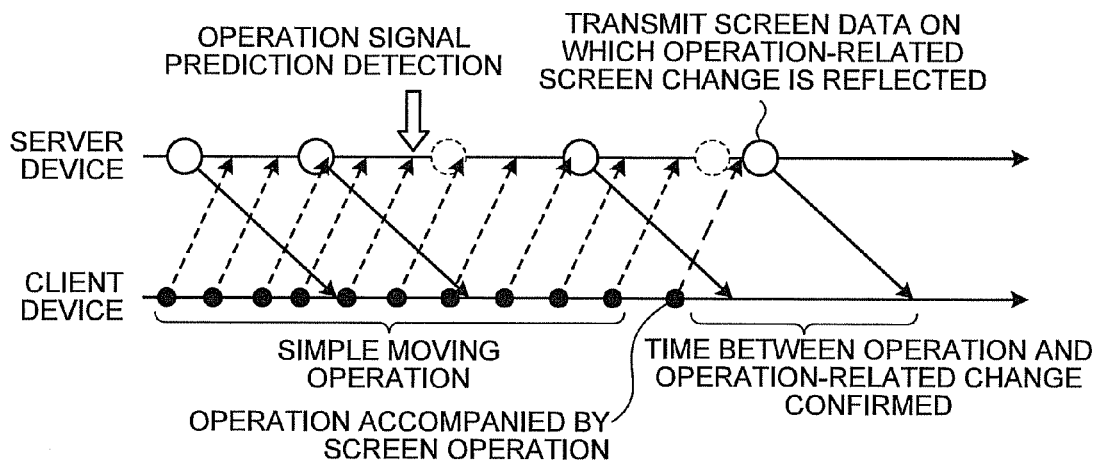
FIG. 7 is a diagram explaining an example of a response time with respect to a specific operation according to the first embodiment.

FIG. 7 is a diagram explaining an example of a response time with respect to a specific operation in the first embodiment. In the example of FIG. 7, when the occurrence frequency of a simple mouse moving operation (mouse moving event) per unit time becomes greater than or equal to the first occurrence frequency, the server device 110 starts predicted detection of a specific operation signal, i.e., prediction of a specific operation accompanied by a screen change, and changes the change detection cycle for the screen data from the first cycle to the second cycle. In the example of FIG. 7, the change detection cycle for the screen data is longer than before the prediction of the specific operation accompanied by a screen change is started, and therefore the possibility of securing available space in the transmission buffer 132 is increased.

For this reason, in the example of FIG. 7, when a specific operation accompanied by a screen change is performed while screen transmission is being constantly conducted from the server device 110 to the client device 190, the screen data generated in accordance with the specific operation (specific operation event) can be transmitted to the client device 190 without delay in response time.

Figure 8:
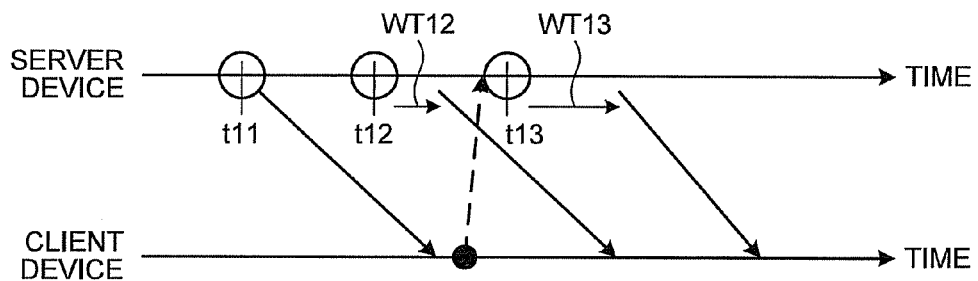
FIG. 8 is a diagram explaining a response delay.
Figure 9:
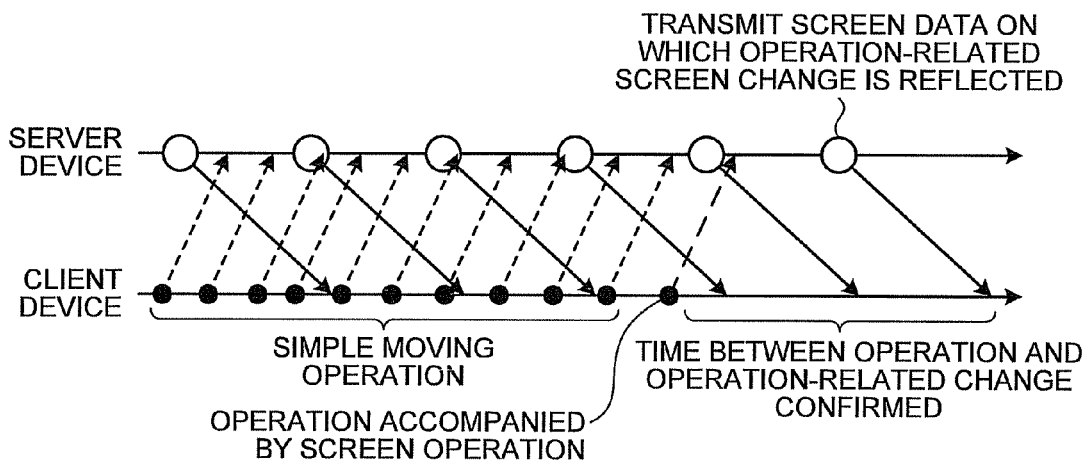
FIG. 9 is a diagram explaining a comparison example of a response time with respect to the specific operation.

Delays in response time are explained with reference to FIGS. 3, 8, and 9 as comparative examples. FIG. 8 is a diagram explaining delay in response, and FIG. 9 is a diagram explaining a comparative example of a response time in the specific operation.

In the example of FIG. 3, it is assumed that the video screen 142 changes ten frames per second (at the change rate of 10 frames/second). Furthermore, a button switch is displayed for video reproducing and pausing on the operation screen 144, as described above. When the user places the mouse pointer 146 on the button switch and clicks the mouse, the display content of the button changes between, for example, "replay button" and "pause button".

In general, on the same screen of the client device as the screen 140, when placing the mouse pointer 146 onto the "pause button" of the operation screen 144 and clicking the mouse during the reproduction of the video on the video screen 142, the display of the button switch is instantly switched to the "replay button", and the video that is being reproduced on the video screen 142 is paused.

However, because the video is being reproduced, it is highly probable that the transmission buffer of the server device is always fully occupied in a situation that images of the video screen 142 are constantly transferred from the server device to the client device. With the transmission buffer being fully occupied, new data cannot be stored in the transmission buffer until any available space is generated. This causes a delay in transmission. For this reason, when the mouse is clicked with the mouse pointer 146 positioned on the "pause button" of the operation screen 144 during the reproduction of the video on the video screen 142, a wait time is caused until the display of the button switch is changed to the "replay button" and the video that is being reproduced on the video screen 142 is paused.

In the example of FIG. 8, it is assumed that the server device detects a screen change at time t11, creates screen data that is to be transmitted to the client device, detects the next screen change at time t12, and creates another screen data that is to be transmitted to the client device.

If the transmission buffer is fully occupied with the screen data created at t11, the screen data created at t12 can only be transmitted after a period of time WT12 elapses when some space becomes available in the transmission buffer.

Moreover, it is assumed that, after the above, a specific operation accompanied by a screen change is performed on the client device, in which the mouse is clicked with the mouse pointer 146 placed on the "pause button" of the operation screen 144.

Then, the client device transmits the operation data indicating the specific operation to the server device, and the server device creates the screen data (the screen data in which the button switch is changed from "pause button" to "replay button") is created in accordance with the specific operation and transmits it to the client device.

Here, if the server device detects a screen change in accordance with the specific operation at t13 and creates screen data that is to be transmitted to the client device, but if the transmission buffer is fully occupied, the screen data can be transmitted only after a period of time WT13 elapses when some space becomes available in the transmission buffer.

For this reason, in the example of FIG. 9, when the change detection cycle for the screen data is not changed, it is highly probable that the transmission buffer 132 is always fully occupied in the situation that screen data is constantly transmitted from the server device to the client device.

Thus, in the example of FIG. 9, even if a specific operation accompanied by a screen change is performed when the screen data is constantly transmitted from the server device 110 to the client device 190, the screen data created in accordance with the specific operation (specific operation event) cannot be transmitted to the client device 190 until some space becomes available in the transmission buffer 132. Then, the response time is delayed, and the operability is lowered.

Second Embodiment

An example of changing a compression ratio when it is detected that the occurrence frequency of the mouse moving event per unit time becomes greater than or equal to the first occurrence frequency will be explained as a second embodiment. In the following explanation, differences with respect to the first embodiment are mainly discussed. Components having functions similar to those of the first embodiment are given the same names and numerals as in the first embodiment, and the explanation thereof is omitted.

Figure 10:
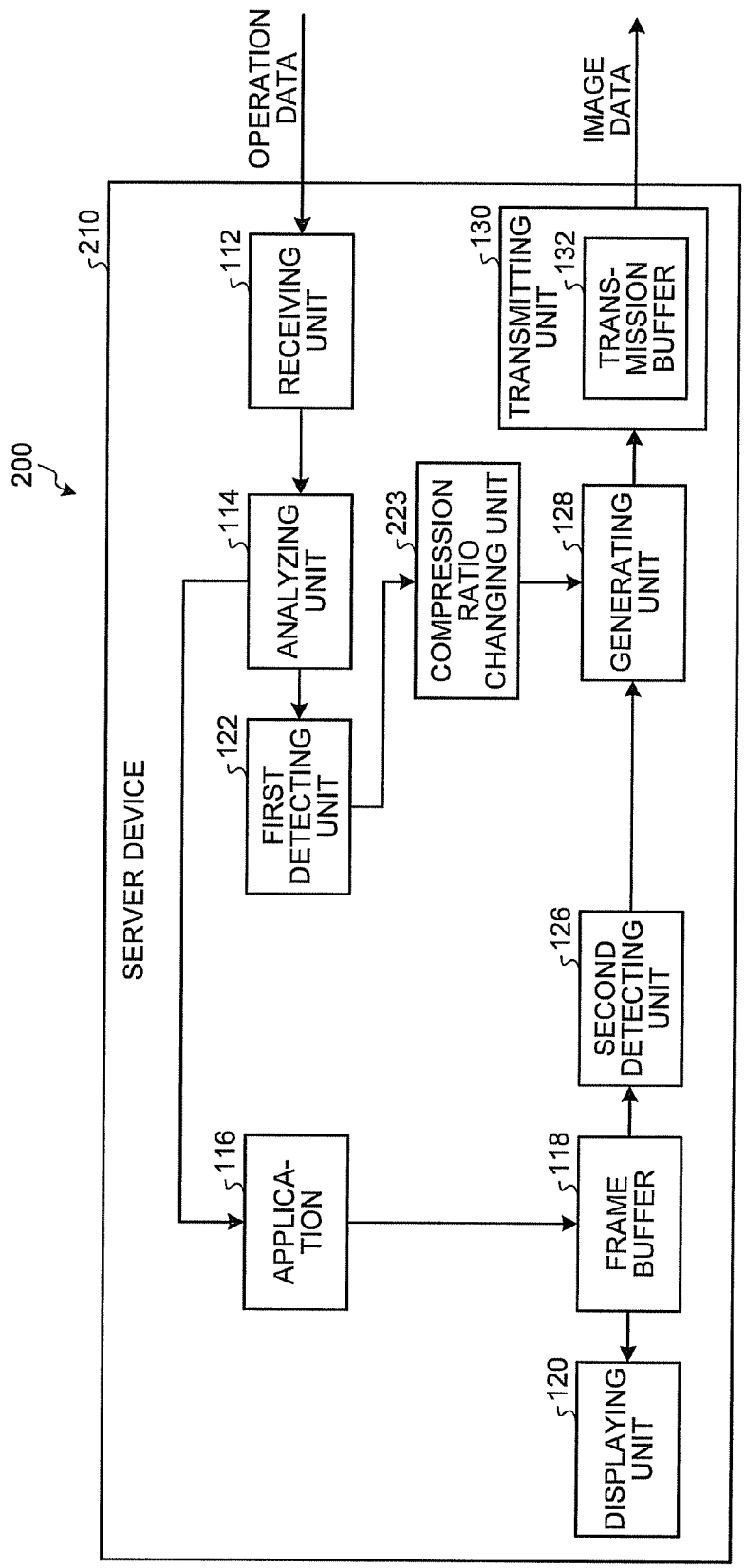
FIG. 10 is a block diagram showing an example structure of a server device according to a second embodiment.

FIG. 10 is a block diagram showing an example structure of a server device 210 according to the second embodiment. As illustrated in FIG. 10, the server device 210 of a screen transmitting system 200 according to the second embodiment is different from the first embodiment in that it includes a compression ratio changing unit 223 in place of the cycle changing unit 124.

In the second embodiment, the first detecting unit 122 outputs a specific operation prediction start signal and a specific operation prediction cancellation signal to the compression ratio changing unit 223, and the second detecting unit 126 determines whether the screen data changes in the first cycle (40 milliseconds, for example).

When the first detecting unit 122 detects a specific operation event, the compression ratio changing unit 223 changes the compression ratio of the screen data from the first compression ratio to the second compression ratio that is higher than the first compression ratio. More specifically, when the first detecting unit 122 detects that the occurrence frequency of the mouse moving event per unit time becomes greater than or equal to the first occurrence frequency, i.e., when a specific operation prediction start signal is input from the first detecting unit 122, the compression ratio changing unit 223 changes the compression ratio of the screen data from the first compression ratio to the second compression ratio. Similarly, when a specific operation prediction cancellation signal is input from the first detecting unit 122, the compression ratio changing unit 223 changes the compression ratio of the screen data from the second compression ratio to the first compression ratio.

For example, when the specific operation prediction start signal is input, the compression ratio changing unit 223 changes the compression ratio of the screen data from 50% to 80%, and when the specific operation prediction cancellation signal is input, it changes the compression ratio of the screen data from 80% to 50%. The values of the first compression ratio and the second compression ratio, however, are not limited to the above, and may be suitably determined.

If the generating unit 128 is allowed to compress the screen data at different compression ratios for different areas of the screen, the compression ratio changing unit 223 may change the compression ratio from the first compression ratio to the second compression ratio for the video screen 142 only (the area indicated by the positional data of the video screen 142) in the example of FIG. 3. In such a situation, the compression ratio changing unit 223 may store therein the positional data of the video screen 142 in advance, or may use the result of the detection obtained by the second detecting unit 126 from the frequency of the screen change or the like. Alternatively, the positional data of the video screen 142 may be stored in advance in the generating unit 128.

In the second embodiment, the generating unit 128 creates compressed screen data by compressing the updated screen data at a compression ratio updated by the compression ratio changing unit 223. That is, when the compression ratio indicates 50%, the generating unit 128 compresses the updated screen data at the compression ratio of 50% to create compressed screen data, and when the compression ratio indicates 80%, it compresses the updated screen data at the compression ratio of 80% to create compressed screen data.

Figure 11:
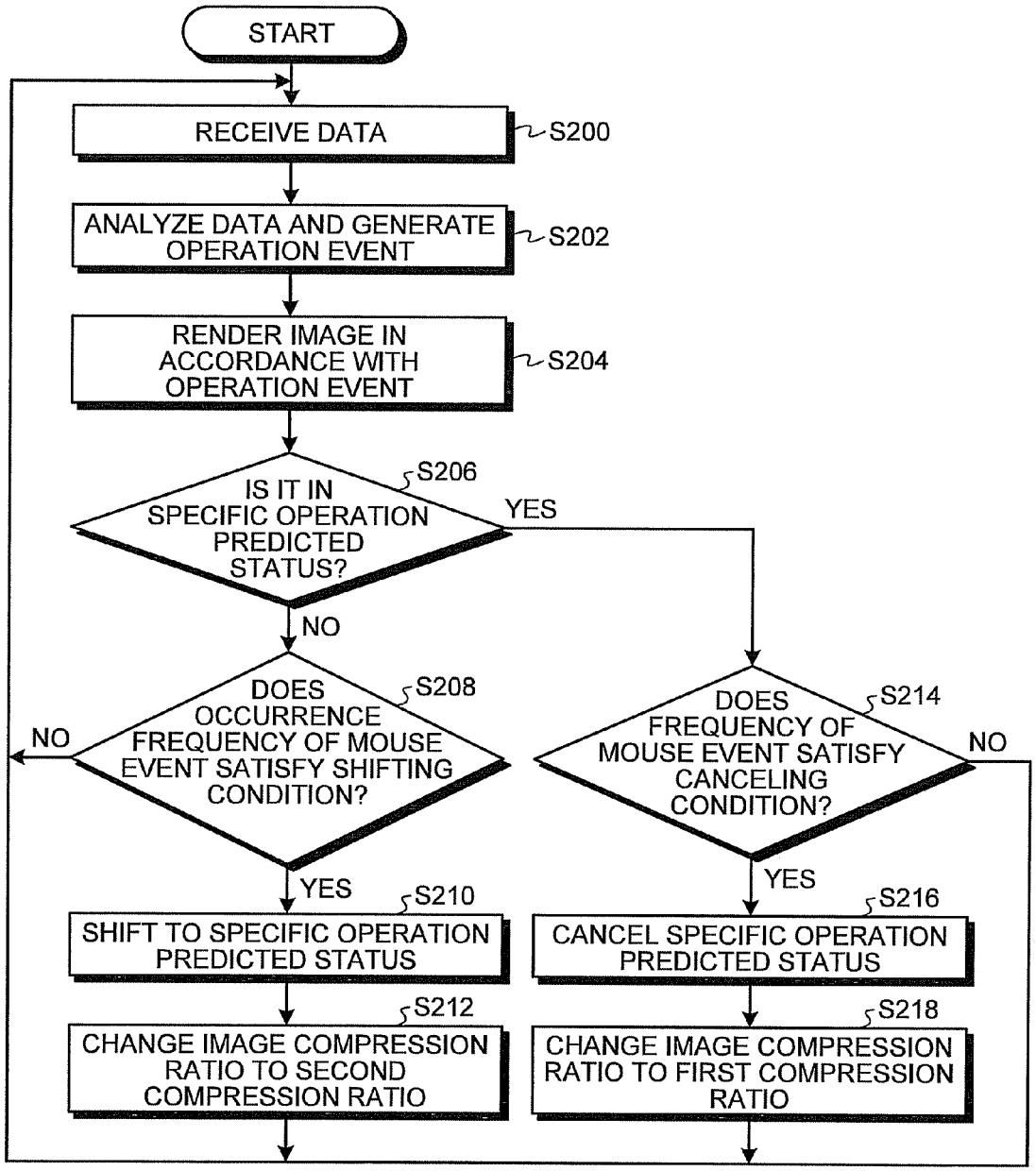
FIG. 11 is a flowchart of an example of a screen compression ratio changing process according to the second embodiment.

FIG. 11 is a flowchart of an example of the screen compression ratio changing process performed by the server device 210 according to the second embodiment.

First, the operations of steps S200 through S210 are the same as the operations of steps S100 through S110 indicated in the flowchart of FIG. 4.

At step S212, when a specific operation prediction start signal output from the first detecting unit 122 is input, the compression ratio changing unit 223 changes the compression ratio of the screen data (image data) from the first compression ratio to the second compression ratio (step S212), and the system returns to step S200.

Furthermore, the operations of steps S214 through S216 are the same as the operations of steps S114 through S116 indicated in the flowchart of FIG. 4.

At step S218, when a specific operation prediction cancellation signal output from the first detecting unit 122 is input, the compression ratio changing unit 223 changes the compression ratio of the screen data (image data) from the second compression ratio to the first compression ratio (step S218), and the system returns to step S200.

As discussed above, according to the second embodiment, when the occurrence frequency of the mouse moving event per unit time becomes greater than or equal to the first occurrence frequency, the compression ratio of the screen data is changed from the first compression ratio to the second compression ratio that is higher than the first compression ratio. Thus, even when the screen data is being continuously transmitted from the server device 210 to the client device 190, the amount of to-be-transmitted data generated by the generating unit 128 can be suppressed, and the amount of data stored in the transmission buffer 132 can be suppressed. Thus, the possibility of avoiding the situation of no space available in the transmission buffer 132 can be improved. Hence, when a specific operation event accompanied by a screen change such as mouse clicking or double-clicking and key pressing occurs in the near future, the screen data created in accordance with the specific operation event can be transmitted from the client device 190 without delay. In other words, even when the screen data is constantly being transmitted from the server device 210 to the client device 190, a delay can be avoided in the response time when a specific operation is performed on the client device 190 and a screen change in accordance with the specific operation is reflected on the client device 190, and thus excellent operability can be maintained.

Figure 12:
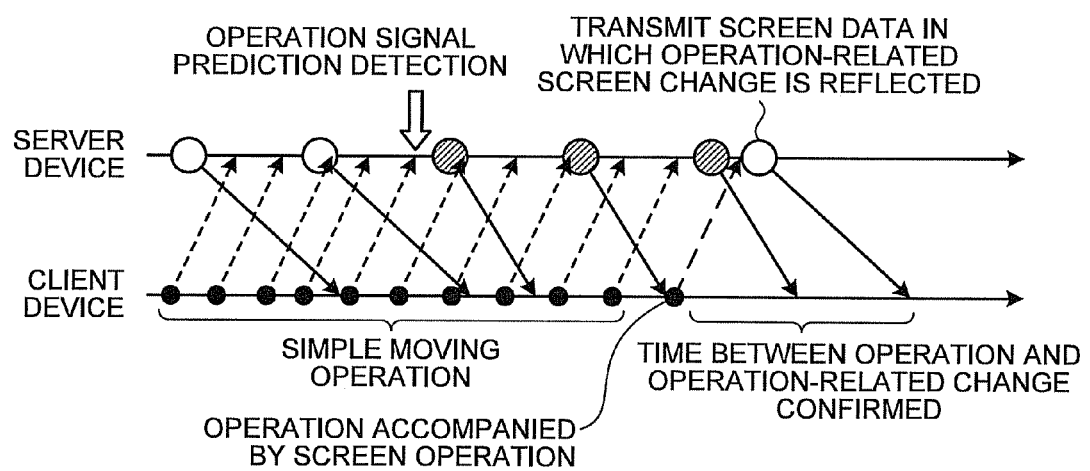
FIG. 12 is a diagram explaining an example of a response time with respect to a specific operation according to the second embodiment.

FIG. 12 is a diagram explaining an example of a response time in the specific operation in the second embodiment. In the example of FIG. 12, when the occurrence frequency of a simple mouse moving operation (mouse moving event) per unit time becomes greater than or equal to the first occurrence frequency, the server device 210 starts predicted detection of a specific operation signal, i.e., prediction of a specific operation accompanied by a screen change, and changes the compression ratio of the screen data from the first compression ratio to the second compression ratio. In the example of FIG. 12, the possibility that the transmission buffer 132 has available space is increased compared to the possibility before the prediction of the specific operation accompanied by a screen change is started.

For this reason, in the example of FIG. 12, when a specific operation accompanied by a screen change is performed while the screen data is constantly being transmitted from the server device 210 to the client device 190, the screen data generated in accordance with the specific operation (specific operation event) can be transmitted to the client device 190 without a delay in response time.

Third Embodiment

An example of changing the change detection cycle of screen data in accordance with the cycle of generating the compressed screen data will be explained as a third embodiment. In the following explanation, differences with respect to the first embodiment are mainly discussed, and the components having the same functions as those of the first embodiment are given the same names and numerals as in the first embodiment, for which the explanation is omitted here.

Figure 13:
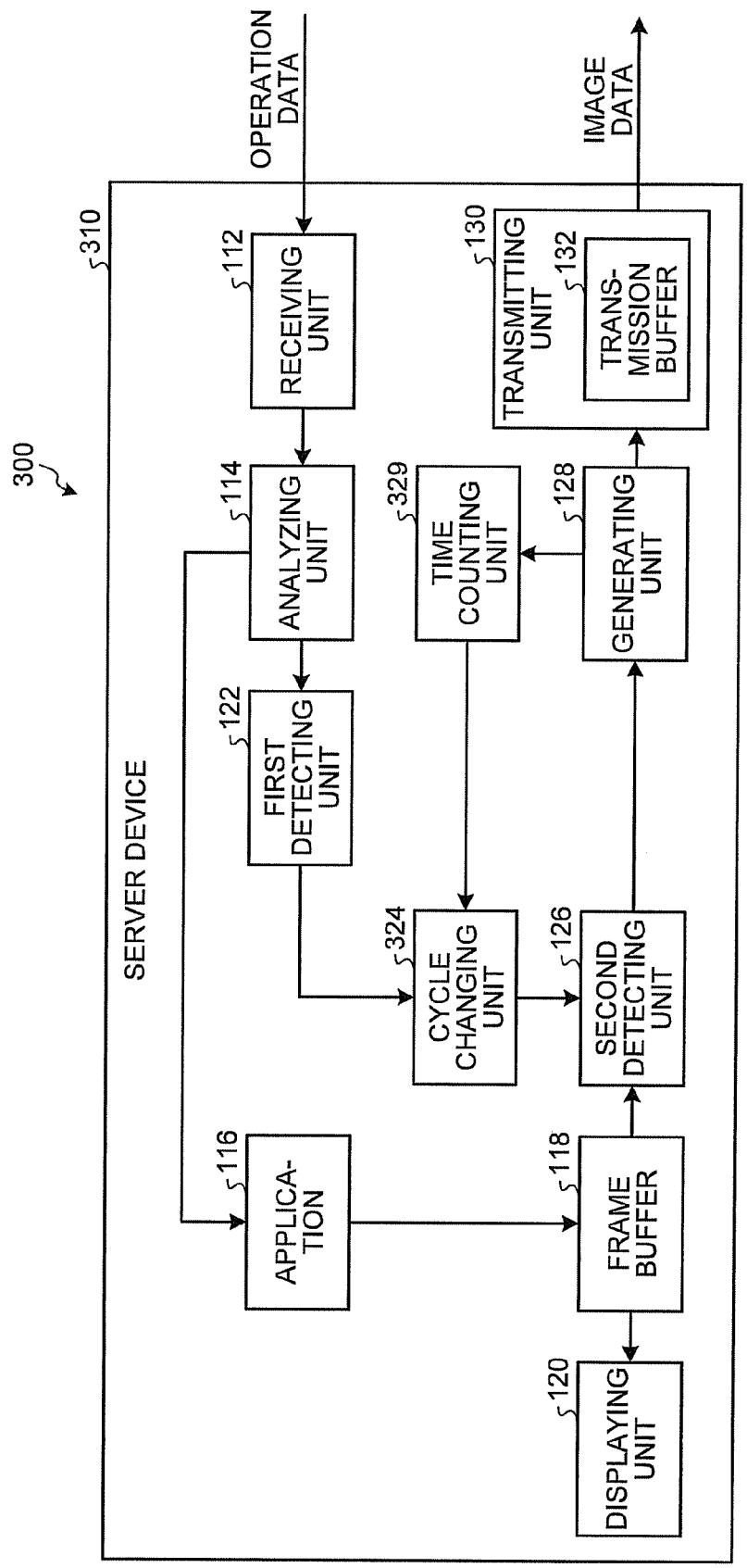
FIG. 13 is a block diagram showing an example structure of a server device according to a third embodiment.

FIG. 13 is a block diagram showing an example structure of a server device 310 according to the third embodiment. As indicated in FIG. 13, a time counting unit 329 that is included in the server device 310 of a screen transmitting system 300 and the process performed by a cycle changing unit 324 according to the third embodiment are differences with respect to the first embodiment.

The time counting unit 329 counts time of a cycle of the generating unit 128 creating the compressed screen data.

The cycle changing unit 324 changes the change detection cycle for the screen data to a cycle longer than the generation cycle that is counted by the time counting unit 329.

If the cycle of the generating unit 128 creating the compressed screen data becomes longer than the change detection cycle for the screen data due to the compression process or the like, a delay is caused in creating the compressed screen data. In the third embodiment, because the change detection cycle for the screen data is changed to a cycle that is longer than or equal to the generation cycle counted by the time counting unit 329, a delay in creating the compressed screen data can be avoided.

The cycle changing unit 324 may change the change detection cycle of the screen data to a generation cycle counted by the time counting unit 329 in a normal state, and set this generation cycle as the first cycle. For example, when the generation cycle counted by the time counting unit 329 is 80 milliseconds in a normal state, the cycle changing unit 324 may change the change detection cycle of the screen data from 40 milliseconds to 80 milliseconds, and set the first cycle to be 80 milliseconds.

Furthermore, the cycle changing unit 324 may be configured to retain the generation cycle counted by the time counting unit 329 in the normal state and set a cycle longer than the retained generation cycle as the second cycle. For example, the cycle changing unit 324 may be configured to retain the generation cycle counted by the time counting unit 329 (80 milliseconds, for example) in the normal state, and, when a specific operation prediction start signal is input from the first detecting unit 122, it may change the change detection cycle of the screen data from 40 milliseconds to 180 milliseconds, which is longer than the retained generation cycle of 80 milliseconds, and set it as the second cycle.

As discussed above, according to the third embodiment, a delay in creating the compressed screen data can be avoided. Thus, even when the screen data is constantly being transmitted from the server device 310 to the client device 190, a delay can be avoided in the response time when the screen change in accordance with a specific operation is reflected on the client device 190 after the specific operation is performed on the client device 190, and excellent operability can be maintained.

Fourth Embodiment

An example of changing the change detection cycle for each area of the screen data will be explained as a fourth embodiment. In the following explanation, differences with respect to the first embodiment are mainly discussed. Components having the same functions as those of the first embodiment are given the same names and numerals as in the first embodiment, and the explanation thereof is omitted.

Figure 14:
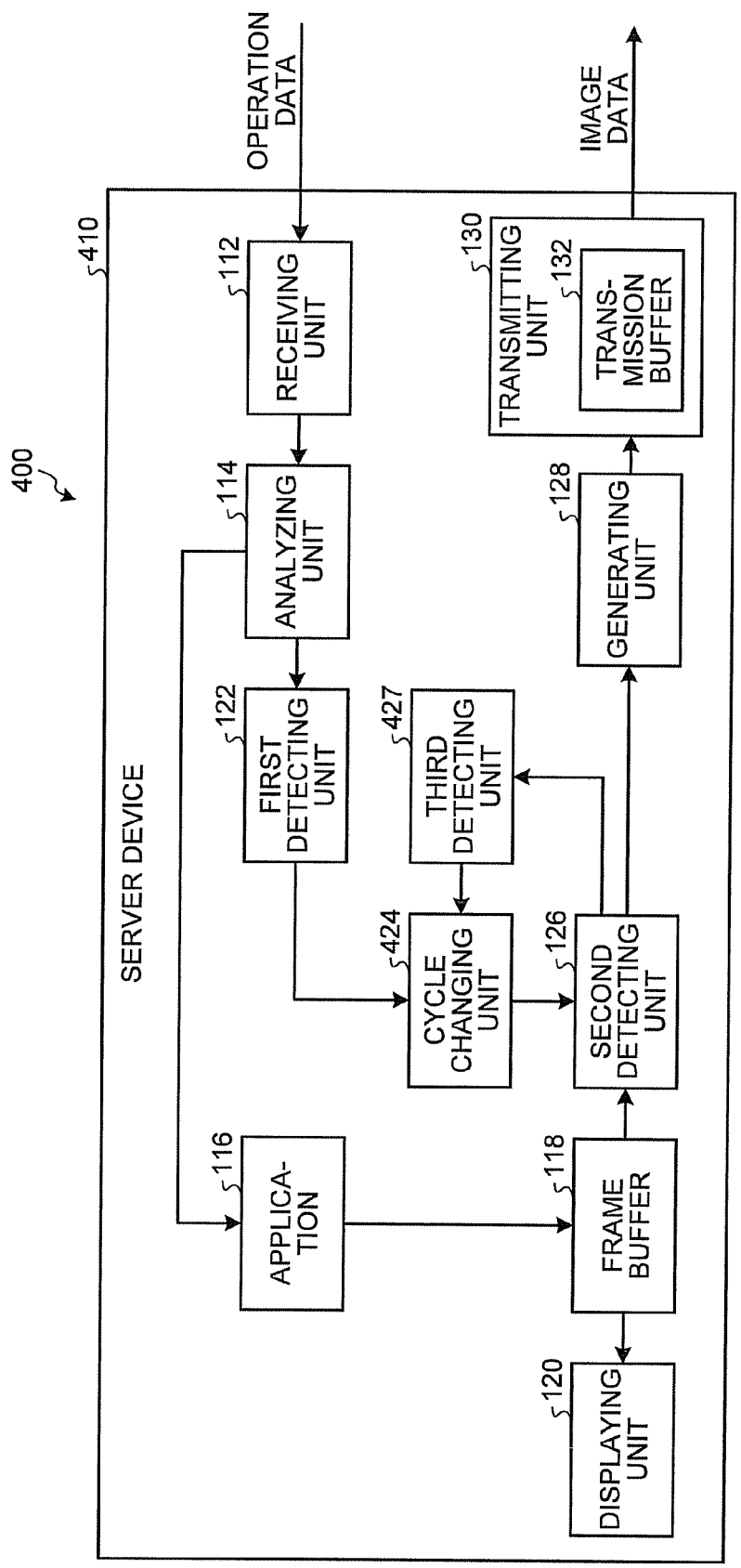
FIG. 14 is a block diagram showing an example structure of a server device according to a fourth embodiment.

FIG. 14 is a block diagram showing an example structure of a server device 410 according to the fourth embodiment. As illustrated in FIG. 14, differences between the fourth embodiment and the first embodiment reside in the server device 410 of a screen transmitting system 400 including a third detecting unit 427 and the process performed by a cycle changing unit 424. In the fourth embodiment, the second detecting unit 126 can detect a change in the screen data in different cycles for different areas of the screen.

The third detecting unit 427 detects and retains the change detection frequency per unit time for each area of the screen data. More specifically, the third detecting unit 427 retains area data that indicates the areas and the change detection frequency data for these areas.

Figure 15:
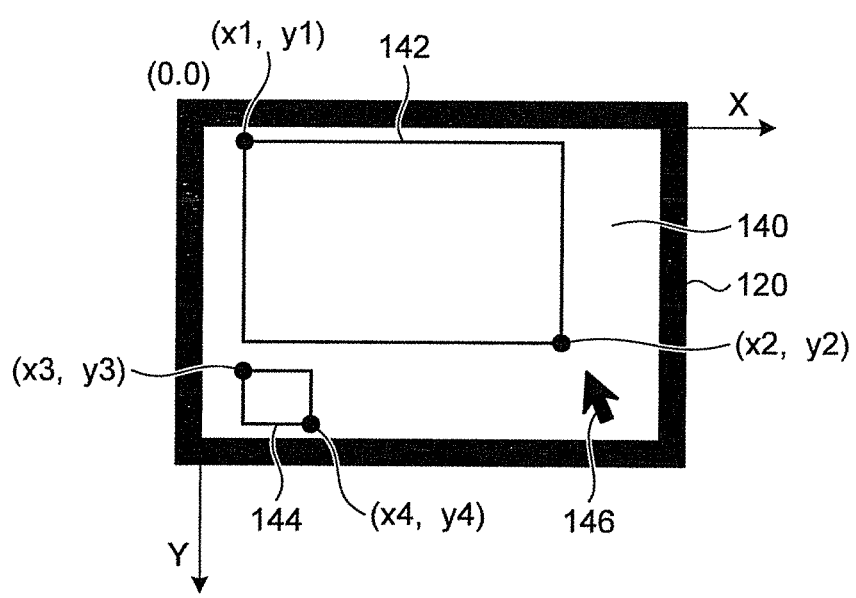
FIG. 15 is a diagram showing an example screen according to the fourth embodiment.

For example, the third detecting unit 427 detects that the second detecting unit 126 detects 10 screen changes (updates) or more per second in an area designated by coordinates ((x1, y1)-(x2, y2)) in the example of FIG. 15. The area designated by coordinates ((x1, y1)-(x2, y2)) is the video screen 142. In this case, the third detecting unit 427 retains [((x1, y1)-(x2, y2)), 10] as the area data and the change detection frequency data.

In the example of FIG. 15, the third detecting unit 427 detects, for example, that the second detecting unit 126 detects 2 screen changes (updates) or more per second in the area designated by coordinates ((x3, y3)-(x4, y4)). The area indicated by the coordinates ((x3, y3)-(x4, y4)) is the operation screen 144. In this case, the third detecting unit 427 retains [((x3, y3)-(x4, y4)), 2] as the area data and the change detection frequency.

When the third detecting unit 427 detects that the second detecting unit 126 detects one screen change (update) or less per second in a specific area, it does not retain the area data and the change detection frequency data of the area.

When a specific operation event is detected, the cycle changing unit 424 changes the change detection cycle of any area in which the change detection frequency detected by the third detecting unit 427 exceeds the first detection frequency from the first cycle to the second cycle. More specifically, when a specific operation prediction start signal is input, the cycle changing unit 424 obtains the area data and the change detection frequency data retained in the third detecting unit 427. When the obtained change detection frequency data exceeds the first detection frequency, the cycle changing unit 424 changes the change detection cycle of the area indicated by the area data from the first cycle to the second cycle. The first detection frequency may be 10 screen changes or more per second detected by the second detecting unit 126, but it is not limited thereto and may be suitably determined.

For example, when a specific operation prediction start signal is input, the cycle changing unit 424 obtains [((x1, y1)-(x2, y2)), 10] and [((x3, y3)-(x4, y4)), 2] from the third detecting unit 427. Then, the cycle changing unit 424 changes the change detection cycle of the area designated by ((x1, y1)-(x2, y2)) from the first cycle to the second cycle so that the change detection frequency of this area becomes 5 per second. The change detection frequency after changing the change detection cycle is not limited thereto. Here, the cycle changing unit 424 retains [((x1, y1)-(x2, y2)), 10] obtained from the third detecting unit 427. Then, when a specific operation prediction cancellation signal is input, the cycle changing unit 424 changes the change detection cycle of the area designated by ((x1, y1)-(x2, y2)) from the second cycle to the first cycle by use of the retained data [((x1, y1)-(x2, y2)), 10] so that the change detection frequency of this area becomes 10 per second.

As discussed above, according to the fourth embodiment, the change detection cycle can be increased for a portion of a video screen having a high change detection frequency. Thus, even when the screen data is constantly transmitted from the server device 410 to the client device 190, a delay can be avoided in response time when a screen change in accordance with a specific operation is reflected on the client device 190 after the specific operation is performed on the client device 190, and excellent operability can be maintained.

Modification 1

Figure 16:
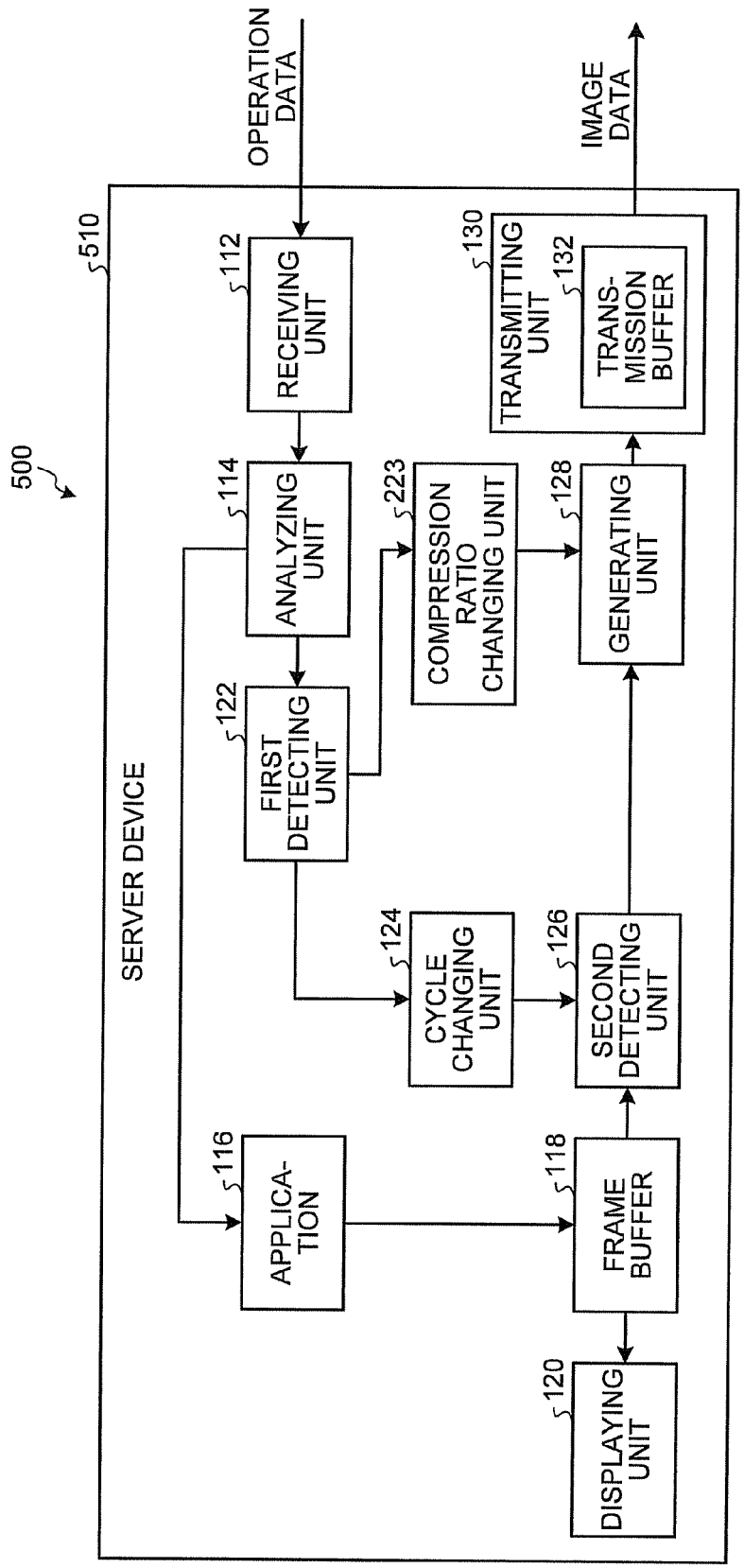
FIG. 16 is a block diagram showing an example structure of a server device according to the first modification example.

As illustrated in FIG. 16, for example, the first embodiment and the second embodiment may be combined. FIG. 16 is a block diagram showing an example structure of a server device 510 according to the first modification. As illustrated in FIG. 16, the server device 510 of a screen transmitting system 500 according to the first modification includes the cycle changing unit 124 and the compression ratio changing unit 223, and changes both the change detection cycle of the screen data and the compression ratio of the screen data.

Modification 2

Figure 17:
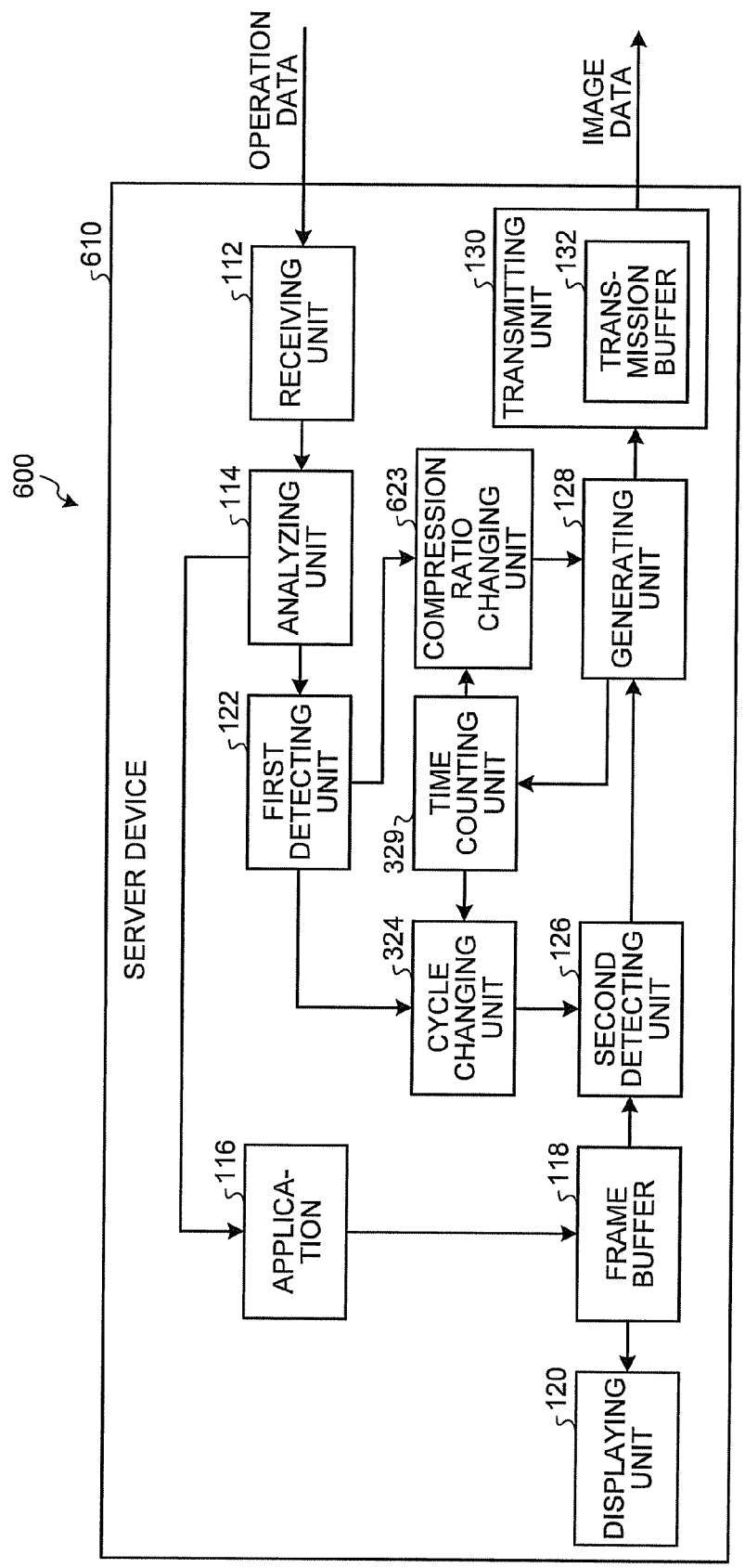
FIG. 17 is a block diagram showing an example structure of a server device according to the second modification example.

Furthermore, as illustrated in FIG. 17, the second embodiment and the third embodiment may be combined. FIG. 17 is a block diagram showing an example structure of a server device 610 according to the second modification. As illustrated in FIG. 17, the server device 610 of a screen transmitting system 600 according to the second modification includes the cycle changing unit 324, the time counting unit 329, and a compression ratio changing unit 623, and changes not only the change detection cycle of the screen data but also the compression ratio of the screen data in accordance with the generation cycle of the compressed screen data.

For example, the compression ratio changing unit 623 is configured to change the compression ratio of the screen data to the first compression ratio (50%, for example), the second compression ratio (80%, for example) that is higher than the first compression ratio, or the third compression ratio (65%, for example) that is higher than the first compression ratio but lower than the second compression ratio.

Then, it is assumed that, when the compression ratio of the screen data is 50%, a specific operation prediction start signal is input from the first detecting unit 122 to the compression ratio changing unit 623. In such a situation, the compression ratio changing unit 623 judges that the screen transmission frequency is high if the generation cycle counted by the time counting unit 329 before the specific operation prediction start signal is input is shorter than 80 milliseconds, and changes the compression ratio of the screen data to 80%. On the other hand, the compression ratio changing unit 623 judges that the screen transmission frequency is low if the generation cycle counted by the time counting unit 329 before the specific operation prediction start signal is input becomes greater than or equal to 80 milliseconds, and changes the compression ratio of the screen data to 65%.

In contrast, it is assumed that, when the compression ratio of the screen data is 80% or 65%, a specific operation prediction cancellation signal is input from the first detecting unit 122 to the compression ratio changing unit 623. Then, the compression ratio changing unit 623 changes the compression ratio of the screen data to 50%.

In the explanation of the second modification, the values of the compression ratios and the generation cycles are merely given as examples, and they are not limited thereto. For example, the fourth compression ratio (55%, for example) may be further prepared so that the compression ratio changing unit 623 may change the compression ratio of the screen data to 65% if the generation cycle counted by the time counting unit 329 becomes greater than or equal to 80 millisecond and smaller than 100 milliseconds when a specific operation prediction start signal is input, and it may change the compression ratio of the screen data to 55% if the generation cycle counted by the time counting unit 329 becomes greater than or equal to 100 milliseconds. In other words, different compression ratios and different generation cycles that serve as criteria for selecting a compression ratio can be suitably determined.

As discussed above, according to the second modification, the compression ratio of the screen data can be changed in accordance with the cycle of creating the compressed screen data. Hence, even when the screen data is constantly transmitted from the server device 610 to the client device 190, a delay can be avoided in response time when a screen change accompanied by a specific operation is reflected on the client device 190 after the specific operation is performed on the client device 190, and excellent operability can be maintained.

Modification 3

Figure 18:
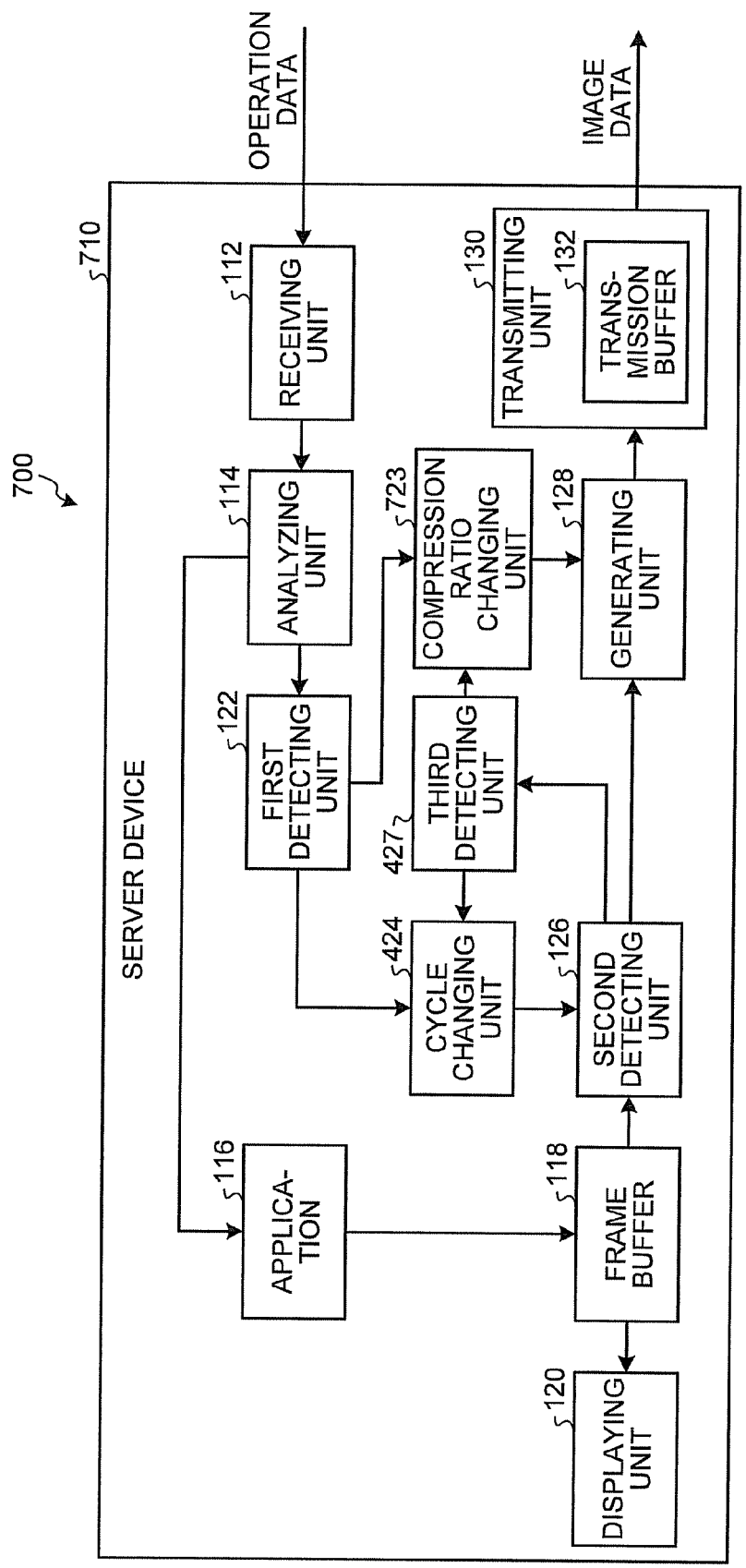
FIG. 18 is a block diagram showing an example structure of a server device according to the third modification example.

Furthermore, as illustrated in FIG. 18, the second embodiment and the fourth embodiment may be combined. FIG. 18 is a block diagram showing an example structure of a server device 710 according to the third modification. As illustrated in FIG. 18, the server device 710 of a screen transmitting system 700 according to the third modification includes the cycle changing unit 424, the third detecting unit 427, and a compression ratio changing unit 723. It changes not only the change detection cycle for each area of the screen data, but also the compression ratio of the screen data for each area of the screen data. According to the third modification, the generating unit 128 is allowed to compress the screen data at different compression ratios for different areas of the screen.

When a specific operation event is detected, the compression ratio changing unit 723 changes the compression ratio of any area in which the change detection frequency detected by the third detecting unit 427 exceeds the first detection frequency from the first compression ratio to the second compression ratio. More specifically, when a specific operation prediction start signal is input, the compression ratio changing unit 723 obtains the area data and the change detection frequency data held in the third detecting unit 427. Then, when the obtained change detection frequency data exceeds the first detection frequency, the compression ratio changing unit 723 changes the compression ratio of the area indicated by the area data from the first compression ratio to the second compression ratio.

For example, when a specific operation prediction start signal is input, the compression ratio changing unit 723 obtains [((x1, y1)-(x2, y2)), 10] and [((x3, y3)-(x4, y4)), 2] from the third detecting unit 427. Then, the compression ratio changing unit 723 changes the compression ratio of the area designated as ((x1, y1)-(x2, y2)) from 50% to 80%. Here, the compression ratio changing unit 723 holds the data [((x1, y1)-(x2, y2)), 10] obtained from the third detecting unit 427. When a specific operation prediction cancellation signal is input, the compression ratio changing unit 723 changes the compression ratio of the area designated as ((x1, y1)-(x2, y2)) from 80% to 50% by use of the held data [((x1, y1)-(x2, y2)), 10].

The values of the compression ratios and the first detection frequency are merely given as examples in the third modification, and therefore are not limited thereto.

As discussed above, according to the third modification, the compression ratio of a portion with a high change detection frequency such as a video screen can be increased. Hence, even when the screen data is constantly transmitted from the server device 710 to the client device 190, a delay can be avoided in the response time when a screen change accompanied by a specific operation is reflected on the client device 190 after the specific operation is performed on the client device 190, and excellent operability can be maintained.

Modification 4

According to the above embodiments and modifications, a mouse operation is used as an example, and the method of predicting a specific operation event has been discussed by use of a mouse moving event, but these are not limited thereto.

For example, the input device may be a keyboard, and a specific operation event may be predicted based on a key operation event. In this case, the first detecting unit is configured to detect that the occurrence frequency of the key operation event per unit time becomes greater than or equal to the first occurrence frequency and thereby predict the occurrence in the near future of a specific operation event accompanied by a screen change such as mouse clicking or double-clicking and key pressing. Here, the first occurrence frequency may be 5 key operation events or more in 5 seconds, but it is not limited thereto and may be suitably determined.

A sensor may be attached to the mouse so that a touch of the user on the mouse can be detected on the mouse side. Then, the server device can be wirelessly notified of the detection result, based on which the server device can predict the occurrence of a specific operation event accompanied by a screen change.

An input device is not limited to a mouse, and a pen-type input device or a remote control for a TV or the like may be adopted. For example, if the input device is a remote control, when the user's handling of the remote control is detected and a specific motion (vertical movement or side-by-side movement) of the remote control main body is detected, the server device may be wirelessly notified of the detection results, based on which the server device can predict the occurrence of a specific operation event accompanied by a screen change.

Modification 5

In addition, according to the above embodiments and modifications, changing of the screen change detection cycles and the compression ratios of the screen data have been explained as the method of suppressing the amount of data stored in the transmission buffer, but the method is not limited thereto. For example, the amount of data stored in the transmission buffer may be suppressed by reducing the screen size transmitted from the server device to the client device.

The server devices according to the above embodiments and modifications include a controlling device such as a central processing unit (CPU), storage devices such as a ROM and RAM, external storage devices such as an HDD and SSD, a display device such as a display, input devices such as a mouse and keyboard, and a communication device such as a communication interface, and have a hardware structure that uses an ordinary computer.

The programs executed by the server devices according to the above embodiments and modifications may be stored and offered in a computer readable medium such as a CD-ROM, a CR-R, a memory card, a DVD, and a flexible disk (FD) in an installable or executable format.

In addition, the programs executed by the server devices according to the above embodiments and modifications may be stored in a computer that is connected to a network such as the Internet, and offered by downloading it through the network. Furthermore, the programs executed by the server devices according to the above embodiments and modifications may be offered or distributed through a network such as the Internet. In addition, the programs executed by the server devices according to the above embodiments and modifications may be placed in advance and offered in a ROM or the like.

The programs executed by the server devices according to the above embodiments and modifications have a module structure in which the above units are realized on a computer. As actual hardware, the CPU reads the programs, for example, from the HDD onto the RAM and executes it so that the units can be realized on the computer.

As discussed above, according to the above embodiments and modifications, even when the screen data is constantly transmitted from the server device to the client device, a delay in a screen change response that is made in accordance with an operation can be avoided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server device connected to a client device by way of a network, comprising:
    a processor that executes the following computer executable components stored in a memory:
        a receiving unit configured to receive operation data through the network;
        a first detecting unit configured to detect, from among operation events based on the received operation data, a specific operation event;
        a cycle changing unit configured to, when the specific operation event is detected, change a change detection cycle for screen data that is updated in an application in accordance with the specific operation event from a first cycle to a second cycle that is longer than the first cycle;
        a second detecting unit configured to detect a change in the screen data in the second cycle;
        a generating unit configured to compress the screen data, in which the change is detected, at a specific compression ratio and generate compressed screen data;
        a time counting unit configured to count a generation cycle of the compressed screen data; and
        a transmitting unit configured to transmit the compressed screen data to the client device,
        wherein the cycle changing unit changes the change detection cycle to a cycle longer than or equal to the generation cycle.

2. The device according to claim 1, further comprising a third detecting unit configured to detect a change detection frequency per unit time for each area of the screen data,
    wherein the cycle changing unit changes, when the specific operation event is detected, the change detection cycle of a first area, in which the change detection frequency exceeds a first detection frequency, from the first cycle to the second cycle, and
    the second detecting unit detects a change in the screen data of the first area in the second cycle, and detects a change in the screen data of a second area other than the first area in the first cycle.

3. The device according to claim 1, wherein the first detecting unit detects that an occurrence frequency of the specific operation event per unit time becomes greater than or equal to a first occurrence frequency, and
    the cycle changing unit changes, when it is detected that the occurrence frequency becomes greater than or equal to the first occurrence frequency, the change detection cycle from the first cycle to the second cycle.

4. The device according to claim 3, wherein the first detecting unit further detects, after detecting that the occurrence frequency of the specific operation event per unit time becomes greater than or equal to the first occurrence frequency, that the occurrence frequency becomes smaller than or equal to a second occurrence frequency, and
    the cycle changing unit changes, when it is detected that the occurrence frequency becomes smaller than or equal to the second occurrence frequency, the change detection cycle from the second cycle to the first cycle.

5. A server device connected to a client device by way of a network, comprising:
    a processor that executes the following computer executable components stored in a memory:
        a receiving unit configured to receive operation data through the network;
        a first detecting unit configured to detect, from among operation events based on the received operation data, a specific operation event;
        a second detecting unit configured to detect, in a first cycle, a change in screen data that is updated in accordance with an application and the specific operation event;
        a compression ratio changing unit configured to change, when the specific operation event is detected, a compression ratio of the screen data from a first compression ratio to a second compression ratio that is higher than the first compression ratio;
        a generating unit configured to compress the screen data, in which the change is detected, at the second compression ratio and generate compressed screen data;

a time counting unit configured to count a generation cycle of the compressed screen data; and a transmitting unit configured to transmit the compressed screen data to the client device, wherein the compression ratio changing unit changes, when the specific operation event is detected, the compression ratio of the screen data from the first compression ratio to a compression ratio that corresponds to the generation cycle.

6. The device according to claim 5, further comprising a third detecting unit configured to detect a change detection frequency per unit time for each area of the screen data, wherein the compression ratio changing unit changes, when the specific operation event is detected, the compression ratio for a first area of the screen data, in which the change detection frequency exceeds the first detection frequency, from the first compression ratio to the second compression ratio, and the second detecting unit detects a change in the screen data of the first area in the second cycle, and detects a change in the screen data of a second area other than the first area in the first cycle.

7. The device according to claim 5, wherein the first detecting unit detects that an occurrence frequency of the specific operation event per unit time becomes greater than or equal to the first occurrence frequency, and the compression ratio changing unit changes, when the occurrence frequency becomes greater than or equal to the first occurrence frequency, the compression ratio from the first compression ratio to the second compression ratio.

8. The server device according to claim 7, wherein the first detecting unit further detects, after detecting that the occurrence frequency of the specific operation event per unit time becomes greater than or equal to the first occurrence frequency, that the occurrence frequency becomes smaller than or equal to a second occurrence frequency, and the compression ratio changing unit changes, when it is detected that the occurrence frequency becomes smaller than or equal to the second occurrence frequency, the compression ratio from the second compression ratio to the first compression ratio.

9. A program product having a non-transitory computer readable medium including programmed instructions, wherein the instructions, when executed by a processor of a server device connected to a client device by way of a network, cause the processor to perform:

receiving operation data through the network;

detecting, from among operation events based on the received operation data, a specific operation event;

changing, when the specific operation event is detected, a change detection cycle of screen data that is updated in an application in accordance with the specific operation event from a first cycle to a second cycle that is longer than the first cycle;

detecting a change in the screen data in the second cycle;

compressing the screen data, in which the change is detected, at a specific compression ratio and generating compressed screen data;

counting a generation cycle of the compressed screen data; and transmitting the compressed screen data to the client device, wherein the changing changes the change detection cycle to a cycle longer than or equal to the generation cycle.

10. A program product having a non-transitory computer readable medium including programmed instructions, wherein the instructions, when executed by a processor of a server device connected to a client device by way of a network, cause the processor to perform:

receiving operation data through the network;

detecting, from among operation events based on the received operation data, a specific operation event;

detecting a change in screen data that is updated in accordance with an application and the specific operation event in a first cycle;

changing, when the specific operation event is detected, the compression ratio of the screen data from a first compression ratio to a second compression ratio that is higher than or equal to the first compression ratio;

compressing the screen data, in which the change is detected, at the second compression ratio and generating compressed screen data;

counting a generation cycle of the compressed screen data;

transmitting the compressed screen data to the client device; and changing, when the specific operation event is detected, the compression ratio of the screen data from the first compression ratio to a compression ratio that corresponds to the generation cycle.

* * * * *